(12) United States Patent
Tsuchiuchi et al.

(10) Patent No.: US 7,403,794 B2
(45) Date of Patent: Jul. 22, 2008

(54) CLIENT TERMINAL HAVING A TEMPORARY CONNECTION ESTABLISHING UNIT

(75) Inventors: Takayasu Tsuchiuchi, Tokyo (JP); Yoshinari Kumaki, Tokyo (JP); Ryo Hatano, Tokyo (JP); Hiroyuki Watanabe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 412 days.

(21) Appl. No.: 11/191,992

(22) Filed: Jul. 29, 2005

(65) Prior Publication Data

US 2006/0023651 A1 Feb. 2, 2006

(30) Foreign Application Priority Data

Jul. 29, 2004 (JP) ............... P.2004-220986

(51) Int. Cl.
*H04B 7/00* (2006.01)
(52) U.S. Cl. ..................... 455/552.1; 370/389
(58) Field of Classification Search ............. 455/552.1; 370/389; 705/14; 713/194; 714/100; 726/2
See application file for complete search history.

(56) References Cited

U.S. PATENT DOCUMENTS

| | | | | |
|---|---|---|---|---|
| 2008/0022137 A1* | 1/2008 | Ginter et al. | ................. | 713/194 |
| 2008/0034227 A1* | 2/2008 | Ginter et al. | ................. | 713/194 |
| 2008/0034230 A1* | 2/2008 | Ginter et al. | ................. | 713/194 |
| 2008/0034231 A1* | 2/2008 | Ginter et al. | ................. | 713/194 |
| 2008/0034406 A1* | 2/2008 | Ginter et al. | ................... | 726/2 |
| 2008/0037534 A1* | 2/2008 | Shina | ......................... | 370/389 |
| 2008/0040284 A1* | 2/2008 | Hazel et al. | .................... | 705/64 |
| 2008/0049747 A1* | 2/2008 | McNaughton et al. | ...... | 370/389 |
| 2008/0052172 A1* | 2/2008 | Cohagan et al. | ............... | 705/14 |
| 2008/0052541 A1* | 2/2008 | Ginter et al. | ................. | 713/194 |
| 2008/0059846 A1* | 3/2008 | Rosenthal et al. | ........... | 714/100 |

FOREIGN PATENT DOCUMENTS

| JP | 2002-359623 | 12/2002 |
|---|---|---|
| JP | 2004-072682 | 3/2004 |

* cited by examiner

*Primary Examiner*—William D Cumming
(74) *Attorney, Agent, or Firm*—Finnegan, Henderson, Farabow, Garrett & Dunner, L.L.P.

(57) ABSTRACT

A client terminal for conducting wireless communications with an access point apparatus having apparatus unique information. The client terminal includes: an acceptance unit that accepts entry of the apparatus unique information; a conversion unit that converts the apparatus unique information entered through the acceptance unit into temporary connection information; a temporary connection establishing unit that establishes temporary connection with the access point apparatus to acquire main connection information required for main connection with the access point apparatus based on the temporary connection information; a reception unit that receives the main connection information from the access point apparatus; and a main connection establishing unit that establishes main connection with the access point apparatus based on the main connection information.

3 Claims, 7 Drawing Sheets

| LOWER THREE BYTES OF MAC ADDRESS | WEP | SSID |
|---|---|---|
| 00:00:00 | ABCDE | P4G33F25 |
| 00:FF:01 | | |
| 00:FE:02 | | |
| 00:FD:03 | | |
| 00:00:01 | Z0Y1X | Gwqf5baL |
| 00:FF:02 | | |
| 00:FE:03 | | |
| 00:FD:04 | | |
| 00:00:02 | gRy4P | 014VqolU |
| ⋮ | ⋮ | ⋮ |

60:
TEMPORARY CONNECTION INFORMATION CONVERSION TABLE

CLIENT TERMINAL HAVING A TEMPORARY CONNECTION ESTABLISHING UNIT

RELATED APPLICATIONS

The present disclosure relates to the subject matter contained in Japanese Patent Application No. 2004-220986 filed on Jul. 29, 2004, which is incorporated herein by reference in its entirety.

BACKGROUND OF THE INVENTION

1. Field of the Invention

The present invention relates to a wireless communication technology such as a wireless LAN, and in particular to a client terminal, an access point apparatus, and a wireless connection system for conducting wireless communications.

2. Description of the Related Art

In recent years, wireless communication apparatuses, for examples, apparatuses having a wireless LAN (Local Area Network) function have been widely available on the market and have been used at offices and at homes. However, in the wireless communications, radio waves are used as communication media and thus data can be received anywhere in the range in which radio waves can reach, and it is difficult to limit the communication destinations. Thus, security measures have been a particularly important problem.

For example, with a wireless LAN compliant with IEEE802.11 standard, for example, the main security measures can be roughly classified into three of access control based on a MAC (Media Access Control) address, access control based on SSID (Service Set Identification) and encryption of communications using an encryption key of WEP (Wired Equivalent Privacy).

The MAC address is a unique value assigned to each network card. In the MAC address access control, only client terminals each with the MAC address registered in an access point apparatus are accepted in the access point apparatus and client terminals having other MAC addresses are excluded. However, the MAC address is distributed in the radio zone in a state in which the MAC address is not encrypted and thus if a third party intercepts the MAC address, spoofing can be done easily.

The SSID is an ID added to each access point apparatus and is provided for the purpose of permitting communications to be conducted only in the SSID match combination.

Last, the encryption using an encryption key such as a WEP key is defensive means for changing the encryption key for each communication destination, thereby preventing a packet from being broken if the packet is intercepted. Although the means involves a problem of vulnerability concerning the used encryption key, it is widely known as comparatively high security means as compared with the MAC address and the SSID. To furthermore enhance safety, a more advanced encryption system, a method using authentication based on IEEE802.1X and the like are carried out and proposed.

For example, JP-A-2004-072682 proposes a connection method for making comparatively safe wireless communication connection even in a client terminal not previously possessing the account or certificate corresponding to an authentication process in a communication system wherein authentication such as IEEE802.1X is required. In this method, a wireless communication link using a comparatively low-level encryption system is once established between an access point apparatus and a client terminal and authentication data required for conducting wireless communications based on a high-level encryption system wherein an authentication process is required is transmitted to the client terminal and then the link is once discarded and again wireless communications based on the high-level encryption system using the authentication data are conducted.

Wireless connection at a high level of safety has been made possible as described above.

SUMMARY OF THE INVENTION

Wireless communication apparatuses such as a wireless LAN devices have been widely available; however, generally the wireless communication connection requires intricate work of entering the MAC address, SSID, and encryption key of the access point apparatus if the wireless LAN is used, for example. However, most users have limited knowledge of the wireless communications and such users find difficulty and intricacy in doing the work.

On the other hand, wireless communications with easy setting not requiring authentication or encryption can also be realized, but there is a large security problem such as a danger that a third party may intercept the communications.

The invention provides a wireless connection system for enabling the user to make easy settings concerning connection at a high level of safety.

According to a first aspect of the invention, there is provided a client terminal for conducting wireless communications with an access point apparatus having apparatus unique information, the client terminal including: an acceptance unit that accepts entry of the apparatus unique information; a conversion unit that converts the apparatus unique information entered through the acceptance unit into temporary connection information; a temporary connection establishing unit that establishes temporary connection with the access point apparatus to acquire main connection information required for main connection with the access point apparatus based on the temporary connection information; a reception unit that receives the main connection information from the access point apparatus; and a main connection establishing unit that establishes main connection with the access point apparatus based on the main connection information.

According to a second aspect of the invention, there is provided an access point apparatus having apparatus unique information and conducts wireless communications with a client terminal, the access point apparatus including: a temporary connection establishing unit that establishes temporary connection based on temporary connection information into which the apparatus unique information is converted in the client terminal; a transmission unit that transmits main connection information required for main connection to the client terminal in a state in which the temporary connection is established; and a main connection establishing unit that establishes main connection with the client terminal based on the main connection information.

According to a third aspect of the invention, there is provided a wireless connection system including: a client terminal; and an access point apparatus having apparatus unique information and conducts wireless communications with the client terminal, wherein the access point apparatus includes: a temporary connection establishing unit that establishes temporary connection based on temporary connection information into which the apparatus unique information is converted in the client terminal; a transmission unit that transmits main connection information required for main connection to the client terminal in a state in which the temporary connection is established; and a main connection establishing unit that establishes main connection with the client terminal based on the main connection information, and wherein the client terminal includes: a conversion unit that converts the apparatus unique information into the temporary connection information; and a reception unit that receives the main connection information from the access point apparatus in a state in which the temporary connection is established based on the provided temporary connection information.

DETAILED DESCRIPTION OF THE EMBODIMENT

An embodiment of a client terminal, an access point apparatus, and a wireless connection system of the invention will be discussed with reference to the accompanying drawings.

Figure 1:
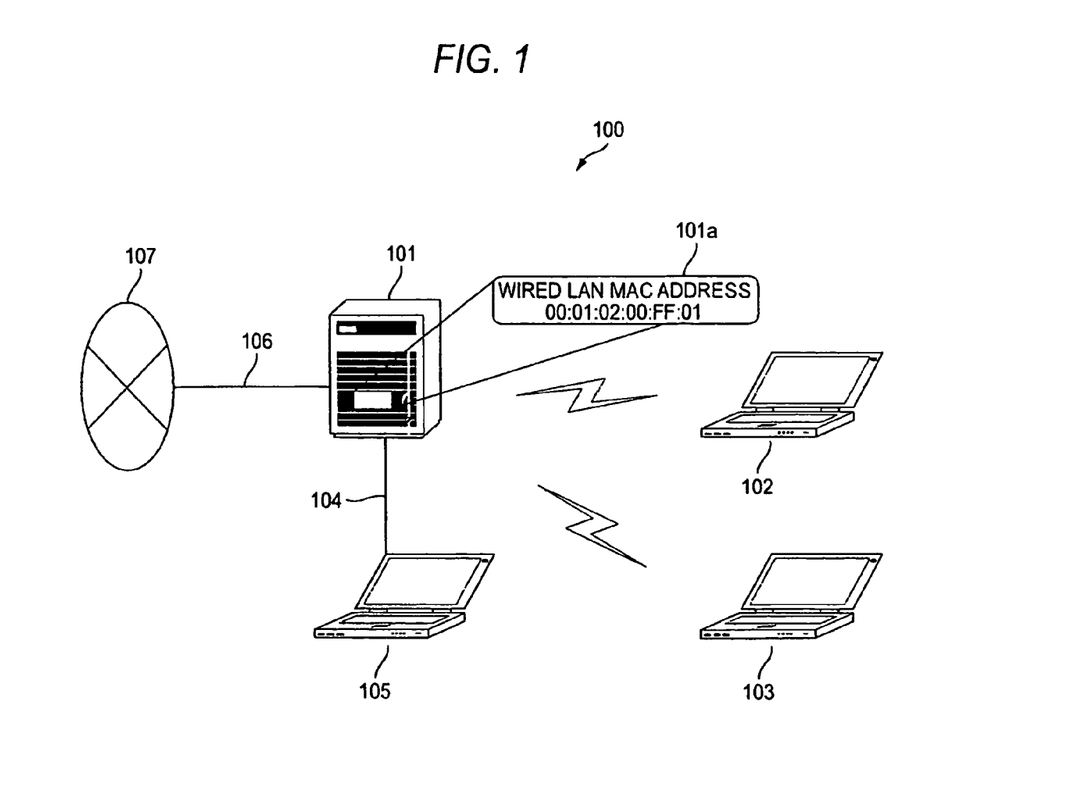
FIG. 1 is a drawing to show the general configuration of a wireless connection system according to an embodiment of the invention.

FIG. 1 shows a configuration of a wireless connection system according to an embodiment of the present invention. As shown in FIG. 1, a wireless connection system 100 includes an access point apparatus 101 of a wireless base station and client terminals 102 and 103 of wireless terminals. A wired LAN MAC address (apparatus unique information) is shown for the access point apparatus 101 in the form of a label 101a. The access point apparatus 101 is also connected to a client terminal 105 by an Ethernet (registered trademark) cable 104. The wired LAN MAC address refers to the unique address assigned to a network card to insert the Ethernet (registered trademark) cable 104 for connecting to the client terminal 105. The access point apparatus 101 connects to an external network 107 through an Ethernet (registered trademark) cable 106.

Figure 2:
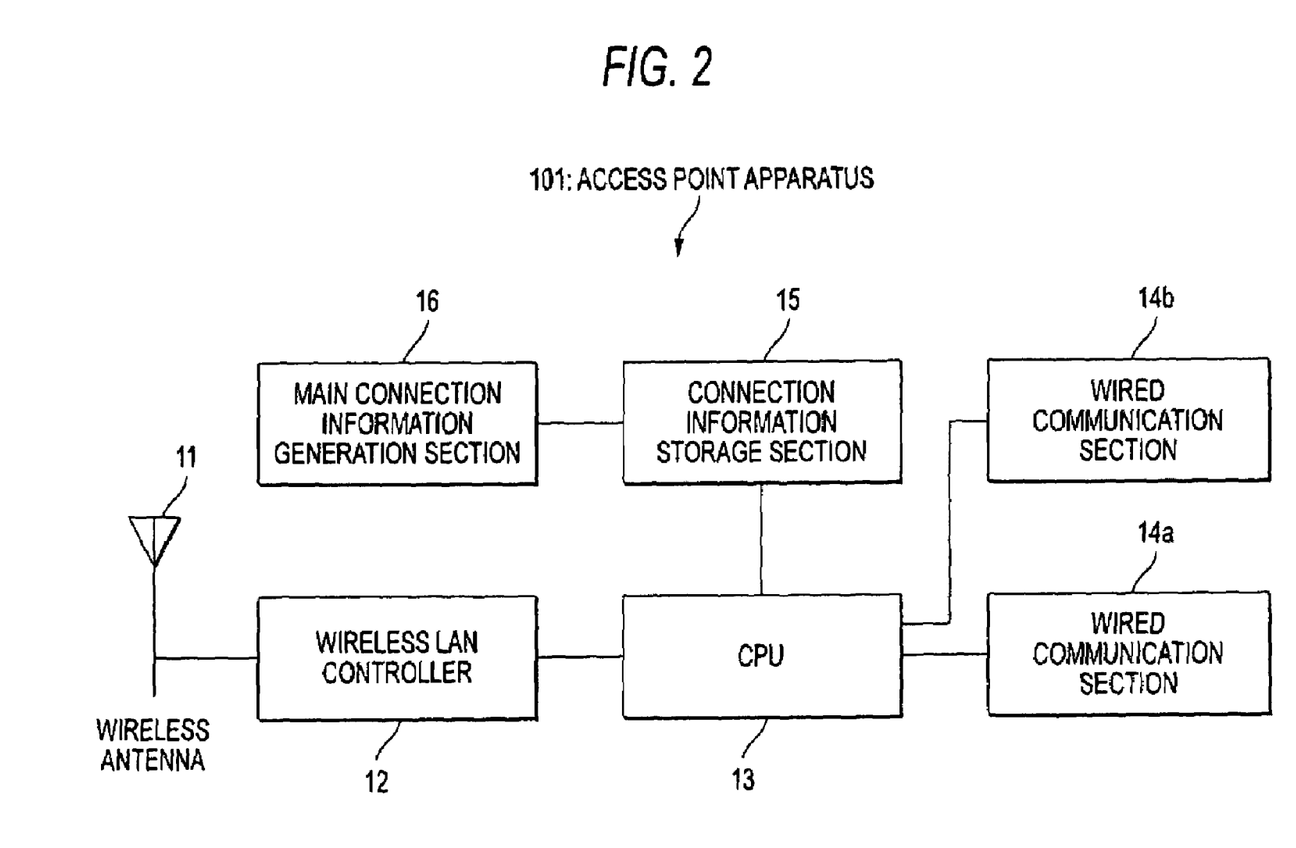
FIG. 2 is a block diagram to show a configuration of an access point apparatus.

FIG. 2 is a block diagram to show the configuration of the access point apparatus 101. As shown in FIG. 2, the access point apparatus 101 includes a wireless antenna 11, a wireless LAN controller 12, a CPU 13, a wired communication section 14a, a wired communication section 14b, a connection information storage section 15, and a main connection information generation section 16.

The wireless antenna 11 conducts wireless communications with a wireless antenna of the client terminal 102. The wireless LAN controller 12 controls the wireless communications. The wireless LAN controller 12 generates a transmission signal on which packet data is superposed, and transmits the signal through the wireless antenna 11 to the client terminal 102 under the control of the CPU 13. The wireless LAN controller 12 also demodulates a radio signal received through the wireless antenna 11 to provide SSID and packet data.

The wired communication section 14a conducts wired communications with the client terminal 105 through the Ethernet cable 104. The wired LAN MAC address (apparatus unique information) is one of unique addresses assigned to the wired communication section 14a.

The wired communication section 14b conducts wired communications with the external network 107 through the Ethernet cable 106.

The connection information storage section 15 stores SSIDs and WEP keys for temporary connection and main connection. The wireless LAN controller 12 uses the SSID and the WEP key for temporary connection or main connection stored in the connection information storage section 15 to conduct wireless communications with the client terminal 102 under the control of the CPU 13. The SSID and the WEP key for temporary connection are previously stored in the connection information storage section 15. The temporary connection refers to tentative connection to transmit information of the SSID and the WEP key used for main connection (main connection information) to the client terminal 102. The main connection is usual connection at a higher level of safety made after the temporary connection.

The main connection information generation section 16 can generate the SSID and the WEP key used for main connection using a random number. The SSID and the WEP key used for main connection created in the main connection information generation section 16 are stored in the connection information storage section 15.

Upon reception of a radio signal of a connection request from the client terminal 102 through the wireless antenna 11, the wireless LAN controller 12 demodulates the radio signal to provide an SSID. When the SSID matches the SSID stored in the connection information storage section 15, the wireless LAN controller 12 conducts communications encrypted with the WEB key stored in the connection information storage section 15 with the client terminal 102.

Figure 3:
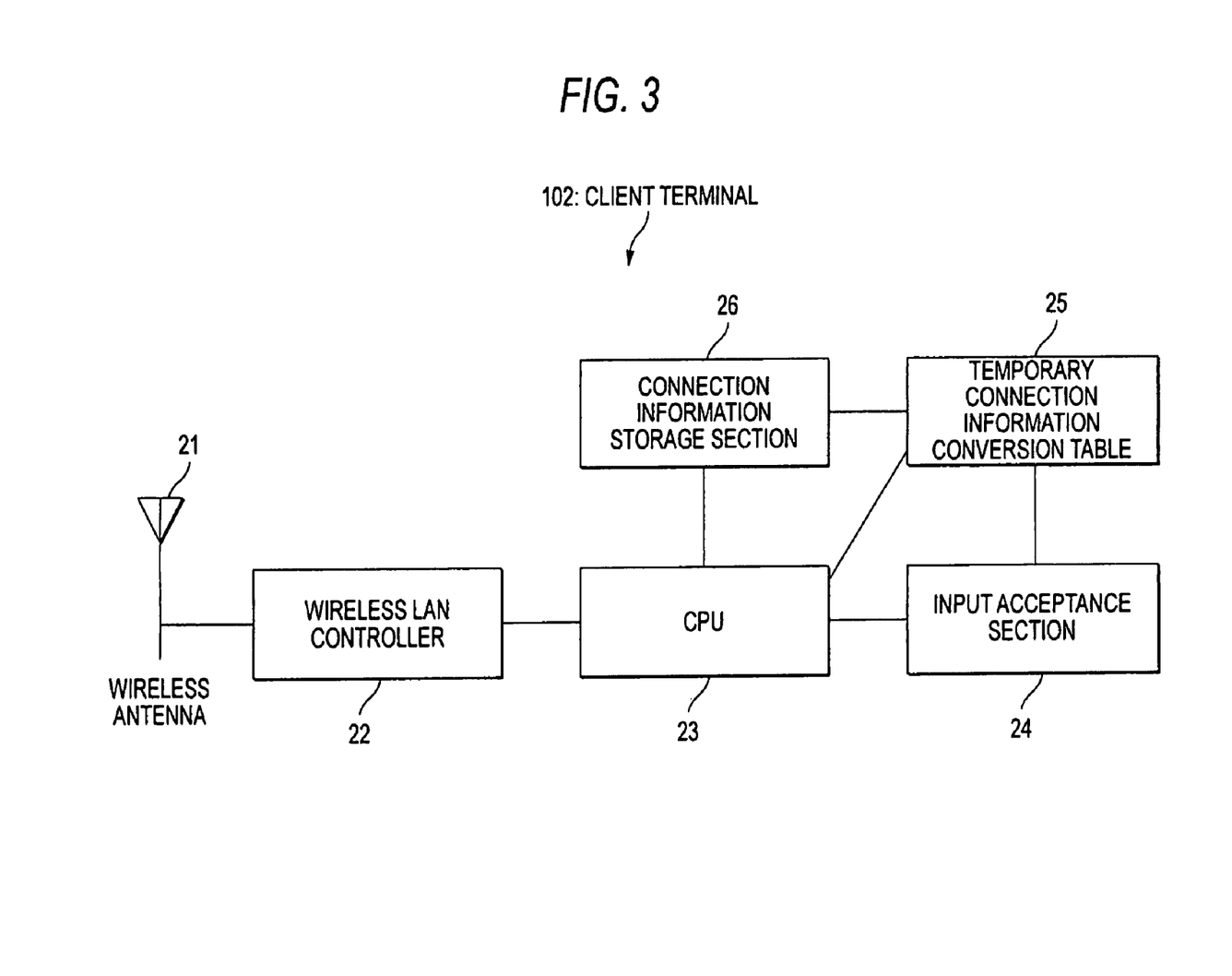
FIG. 3 is a block diagram to show a configuration of a client terminal.

FIG. 3 is a block diagram to show a configuration of the client terminal 102. As shown in FIG. 3, the client terminal 102 includes a wireless antenna 21, a wireless LAN controller 22, a CPU 23, an input acceptance section 24, a temporary connection information conversion table 25, and a connection information storage section 26.

The wireless antenna 21 conducts wireless communications with the wireless antenna 11 of the access point apparatus 101. The wireless LAN controller 22 controls the wireless communications. The wireless LAN controller 22 generates a transmission signal on which packet data is superposed, and transmits the signal through the wireless antenna 21 to the access point apparatus 101 under the control of the CPU 23. The wireless LAN controller 22 also demodulates a radio signal received through the wireless antenna 21 to provide packet data.

The input acceptance section 24 is an interface such as a keyboard for the user to enter the wired LAN MAC address of the access point apparatus 101.

The temporary connection information conversion table 25 is a table for converting the wired LAN MAC address entered through the input acceptance section 24 into SSID and WEP key used for temporary connection under the control of the CPU 23.

The connection information storage section 26 stores SSIDs and WEP keys for temporary connection and main connection. This means that the SSID and the WEP key for temporary connection created based on the temporary connection information conversion table 25 and the SSID and the WEP key for main connection received from the access point apparatus 101 are stored in the connection information storage section 26. The wireless LAN controller 22 uses the information stored in the connection information storage section 26 to conduct wireless communications with the access point apparatus 101 through the wireless antenna 21 under the control of the CPU 23.

The client terminal 102 converts the wired LAN MAC address entered through the input acceptance section 24 into the SSID and the WEP key for temporary connection based on the temporary connection information conversion table 25 and stores the SSID and the WEP key for temporary connection in the connection information storage section 26. The wireless LAN controller 22 sends a connection request to the access point apparatus 101 through the wireless antenna 21 under the control of the CPU 23 based on the SSID and the WEP key stored in the connection information storage section 26.

Figure 4:
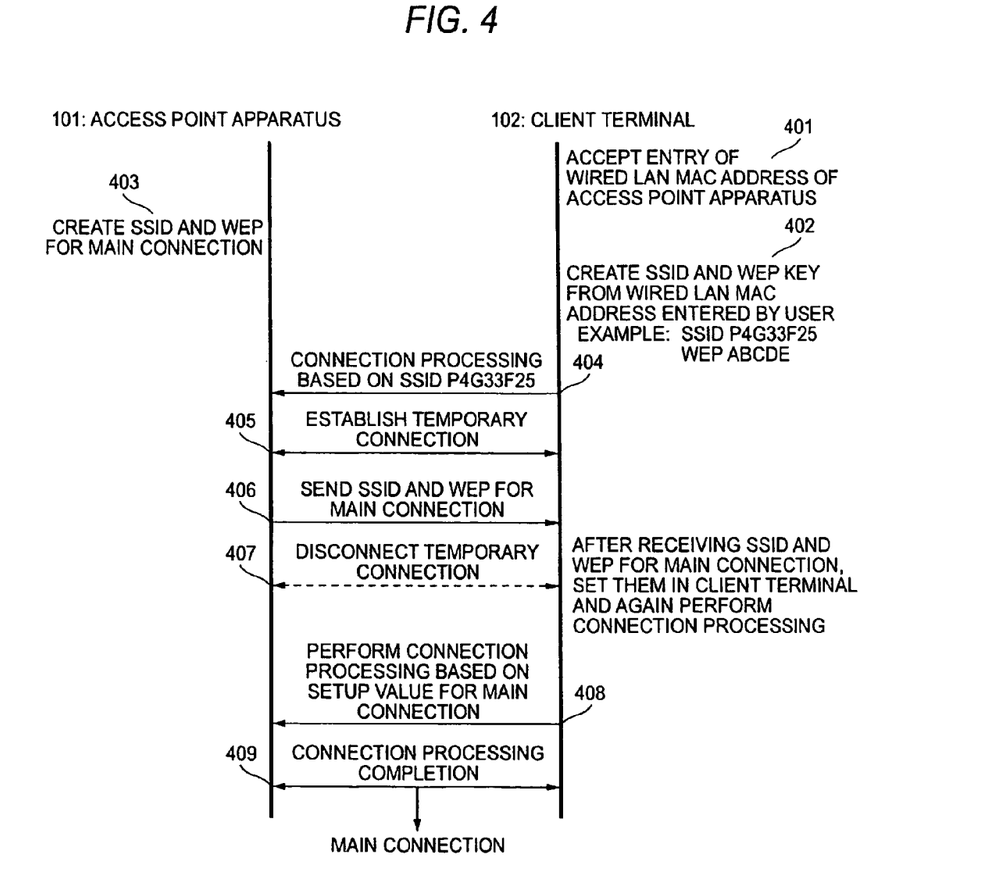
FIG. 4 is a drawing to show an operation procedure of establishing connection in the wireless connection system.

Next, a flow until connection is established in the wireless connection system 100 including the access point apparatus 101 and the client terminal 102 will be discussed. FIG. 4 is a drawing to show the operation until connection of the access point apparatus 101 and the client terminal 102 is established.

Figure 5:
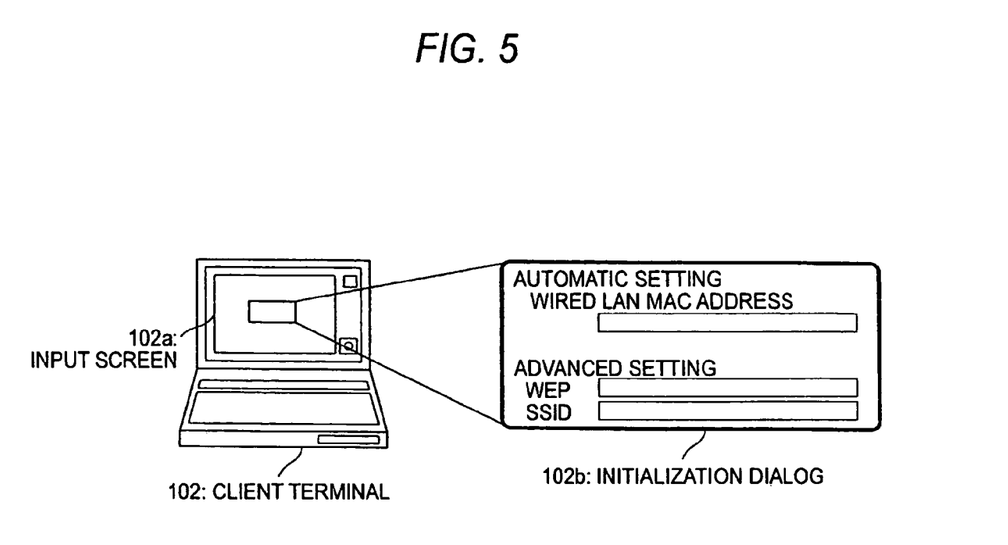
FIG. 5 is a drawing to show a specific example of an input acceptance section in the client terminal.

First, the client terminal 102 accepts entry of the wired LAN MAC address of the access point apparatus 101 (apparatus unique information) (step 401). FIG. 5 shows an example of the interface. In the example in FIG. 5, the user can enter the wired LAN MAC address of the apparatus unique information and the SSID and the WEP key of main connection information in an initialization dialog 102b displayed on an input screen 102a of the client terminal 102. Here, entry of the SSID and the WEP key is advanced setting and the user need not necessarily enter them. At this time, if the user enters only the wired LAN MAC address, main connection is made via temporary connection according to the process described later; if the user enters the SSID and the WEP key, main connection is made without making temporary connection (namely, skipping steps 404 to 407).

Figure 6:
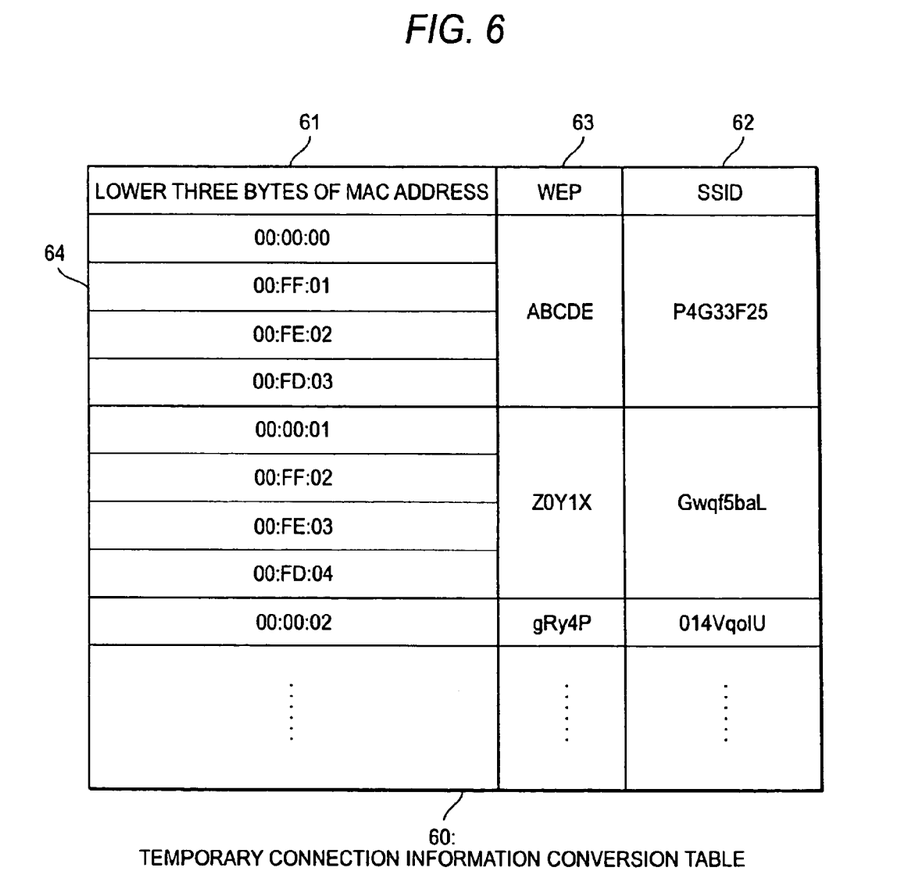
FIG. 6 shows a specific example of a conversion table that is provided in the access point apparatus and the client terminal.

Next, the client terminal 102 converts the wired LAN MAC address into the SSID and the WEP key for temporary connection (step 402). FIG. 6 shows an example of a conversion table for converting the wired LAN MAC address into the SSID and the WEP key. In the example in FIG. 6, the SSID (under column 62) and the WEP key (under column 63) on the row corresponding to the lower three bytes of the wired LAN MAC address are obtained according to the previously retained temporary connection information conversion table based on the entry of the lower three bytes of the wired LAN MAC address. In the first embodiment, the wired LAN MAC address is "00:01:02:00:FF:01" and therefore the SSID "ABCDE" and the WEP key "P4G33F25" described on row 64 corresponding to the lower three bytes (00:FF:01) are obtained.

In the access point apparatus 101, the main connection information generation section 16 previously generates SSID and WEP key used for main connection aside from the SSID and the WEP key used for temporary connection (step 403). The SSID and WEP key generation timing generally is after power of the access point apparatus 101 is turned on or after reset.

Connection processing of the access point apparatus 101 and the client terminal 102 is performed based on the created SSID and WEP key for temporary connection (step 404). The client terminal 102 transmits a connection request frame to the access point apparatus 101 based on the created SSID for temporary connection. If a match is found between the received SSID and the SSID for temporary connection that the access point apparatus 101 previously has, the access point apparatus 101 establishes temporary connection (step 405). In processing after the connection processing, the signal communicated by radio is encrypted based on the WEP key for temporary connection. If the received SSID matches the SSID for main connection, the access point apparatus 101 enters processing of main connection establishment not via temporary connection (namely, skipping steps 404 to 407).

When temporary connection is established, the access point apparatus 101 transmits the SSID and the WEP key for main connection (main connection information) to the client terminal 102 (step 406).

Upon completion of transmission of the SSID and the WEP key for main connection from the access point apparatus 101 to the client terminal 102, the client terminal 102 transmits an acquisition notification that the information has been received to the access point apparatus 101. After receiving the acquisition notification, immediately the access point apparatus 101 disconnects the temporary connection (step 407). The time from establishment of the temporary connection (step 405) to disconnection of the temporary connection (step 407) should be short as much as possible. The reason is that although encrypted, the temporary connection is a parameter created according to the preset conversion table and is at a comparatively low level of safety and therefore the shorter the connection time of temporary connection, the more excellent the safety.

Subsequently, the client terminal 102 performs connection processing for main connection based on the SSID and the WEP key for main connection received from the access point apparatus 101 and stored in the connection information storage section 26 (step 408). The later signal communicated by radio between the access point apparatus 101 and the client terminal 102 is encrypted based on the WEP key for main connection. If the SSID of the connection request from the client terminal 102 is valid, the access point apparatus 101 establishes main connection with the client terminal 102 (step 409).

Further, the case where the client terminal 103 sends a temporary connection request to the access point apparatus 101 in a state in which the main connection of the access point apparatus 101 and the client terminal 102 is established will be discussed. At this time, in the state in which the main connection of the access point apparatus 101 and the client terminal 102 is established, a state in which the SSID for temporary connection from the client terminal 103 can also be accepted at the same time is set and temporary connection with the client terminal 103 is established with the main connection with the client terminal 102 maintained. In this case, the access point apparatus needs to be able to handle two or more SSIDs at the same time, but the connection procedure with the client terminal 103 becomes similar to the procedure described above.

As described above, according to the invention, connection can be established from entry of only the apparatus unique information such as the wired LAN MAC address, so that setting is easy for the user and convenience is improved as compared with the connection technique in the related art in which the main connection information is found from the beginning.

Further, temporary connection for transmitting the main connection information is also encrypted, so that the level of safety is high as compared with a wireless connection method wherein importance is attached to convenience and encryption is not conducted.

The invention is not invention specialized for wireless communications using an encryption system at a comparatively high level of safety such as IEEE802.1X and therefore is also high in general versatility.

At step 401 in the embodiment, the user can enter not only the wired LAN MAC address, but also the SSID and the WEP key for main connection, so that if the user enters the SSID and the WEP, the steps involved in temporary connection (steps 404 to 407) can also be skipped for making main connection.

In the embodiment, the wired LAN MAC address is used as the apparatus unique information. The advantages of using the wired LAN MAC address are as follows: Since the MAC address is a value unique to each network card, there is no possibility that the address may be duplicate with that of any other apparatus and the safety of the temporary connection information such as the SSID and the WEP key into which the MAC address is converted can also be enhanced; and further, since the wired LAN MAC address usually is information not carried on a radio frame, if the wireless communications are intercepted, the encryption source or origin cannot be known and thus the encryption cannot easily be analyzed.

Further, the wired MAC address in the LAN rather than that in a WAN (Wide Area Network) is used, so that the risk of acquiring the wired MAC address from the outside can be more reduced. In FIG. 1, the access point apparatus 101 is connected to the client terminal 105 by the Ethernet (registered trademark) cable 104; in fact, however, the access point apparatus 101 may be unconnected to the client terminal 105.

Usually, the user can know the wired LAN MAC address only if the user approaches the access point apparatus as in the embodiment in which the label of the address is put on the apparatus, so that this point is also useful for improving the safety.

The SSID and the WEP key for temporary connection can be returned at random or almost at random using the conversion table or a conversion function from the apparatus unique information such as the wired LAN MAC address; considering that generally it is dangerous to use a word entered in a dictionary as the WEP key and that the passwords or the like set by human beings are easily one-sided, it can be said that the technique of the embodiment is at a high level of safety.

In the embodiment, connection of the second and later units can be established without disconnecting the main connection. An additional signal reception element of a Bluetooth (registered trademark) signal, an infrared signal, etc., is not required.

How to indicate the apparatus unique information such as the wired LAN MAC address on the access point apparatus may be a mode in which the apparatus unique information can be provided only in a specific location or in the proximity thereof; not only a label, but also indication using an output interface such as a display may be used.

To enter the apparatus unique information such as the wired LAN MAC address in the client terminal, it is also possible to transfer an infrared signal or a Bluetooth signal in addition to the method of entering the apparatus unique information in the terminal screen of the client terminal through the keyboard.

The initialization dialog 102b in FIG. 5 enables the user to enter the SSID and the WEP key for main connection as advance setting as well as the wired LAN MAC address, but may enables the user to enter only the wired LAN MAC address.

The apparatus unique information may be a radio MAC address, a serial number, a keyword set for each apparatus, or the like rather than the wired LAN MAC address. To use the MAC address, in addition to use of the lower-order three bytes of the MAC address as in FIG. 6, any other part of the MAC address may be extracted for use or the whole MAC address may be used.

It is also possible to return temporary connection information such as SSID and WEP key based on some conversion function assuming that the MAC address is a numeric value rather than using a conversion table such as the temporary connection information conversion table 25 in FIG. 3. From the conversion table or the conversion function, both of the SSID and the WEP key of the temporary connection information need not be returned and either of them may be determined based on the apparatus unique information.

The SSID and the WEP key for main connection may be generated at any time before the timing of sending the SSID and the WEP key (step 406 in FIG. 4).

In the embodiment, after receiving the SSID and the WEP key for main connection, the client terminal 102 sends a reception notification to the access point apparatus 101, which then performs disconnection processing. However, an embodiment is also possible wherein after receiving the SSID and the WEP key for main connection, the client terminal 102 performs disconnection processing and starts connection processing of main connection based on the received SSID and WEP key for main connection. At this time, the shorter the time from establishment of the temporary connection to disconnection of the temporary connection, the higher the level of the safety, of course. Since the number of steps can be decreased in the embodiment, the connection time of the temporary connection can be made shorter.

In the first embodiment, only the client terminal 102 has the temporary connection information conversion table 25, but it is also possible that the access point apparatus 101 also has a temporary connection information conversion table. Accordingly, the advantage that when the network configuration changes, flexible steps can be taken is provided. For example, to provide a WDS (Wireless Distribution System) with access point apparatus connected to each other for widening the network range, the wired LAN MAC address of a different access point apparatus is input to the access point apparatus 101, whereby they can be connected in a similar manner to the connection procedure in the first embodiment, and the network configuration can be changed with easy setting and comparatively with safety. When the access point apparatus 101 has the conversion table, if the wired LAN MAC address of the access point apparatus 101 is only known, the SSID and the WEP key for temporary connection can be generated based on the temporary connection information conversion table from the wired LAN MAC address, so that the SSID and the WEP key of the temporary connection information need not previously be stored in the connection information storage section 15. The possible timing at which the SSID and the WEP key for temporary connection are generated is when the power of the access point apparatus 101 is turned on or when reset or when a connection request with SSID not stored in the connection information storage section 15 is made or the like.

As a modification of the embodiment, the access point apparatus 101 may have refusal unit, when an erroneous connection request concerning temporary connection has been received a given number of times or more, such as five successive times, from a client terminal, the refusal unit for refusing the connection request from the client terminal for a given time of 60 seconds, etc., for example. Whether the connection request is erroneous or valid can be determined based on whether or not SSIDs match. In the first embodiment, only the wired LAN MAC address is required and the conversion table for converting the wired LAN MAC address into the SSID and the WEP key is preset and therefore the system has some vulnerability to an attack of sending a connection request to the access point apparatus in a brute force manner from a malicious client terminal as compared with the connection technique in the related art for requiring information of SSID, WEP key, etc., from the beginning. Then, if the refusal unit is included, connection based on such connection requests in a brute force manner can be suppressed. The connection request refusal time and the number of times an erroneous request has been made before transition to the refusal mode are arbitrary and can also be set by the user.

In the first embodiment, the main connection information such as the SSID is generated at random in the main connection information generation section, but may be able to be previously entered and set in the access point apparatus by the user. Further, it is also possible to enable the user to select the user preset mode and the access point apparatus generation method. The system may be returned from the refusal mode after the expiration of a given time of 60 seconds, etc., as described above or if an erroneous connection request is not made for a certain time period, for example, 60 seconds.

By the way, in the configuration in FIG. 1, the number of the client terminals is two, but may be any including one. In the example in FIG. 1, the client terminals are provided as PCs (personal computers), however, the client terminals may be provided as other communication apparatus such as a mobile telephone, and a PDA (personal digital assistant) equipment.

Figure 7:
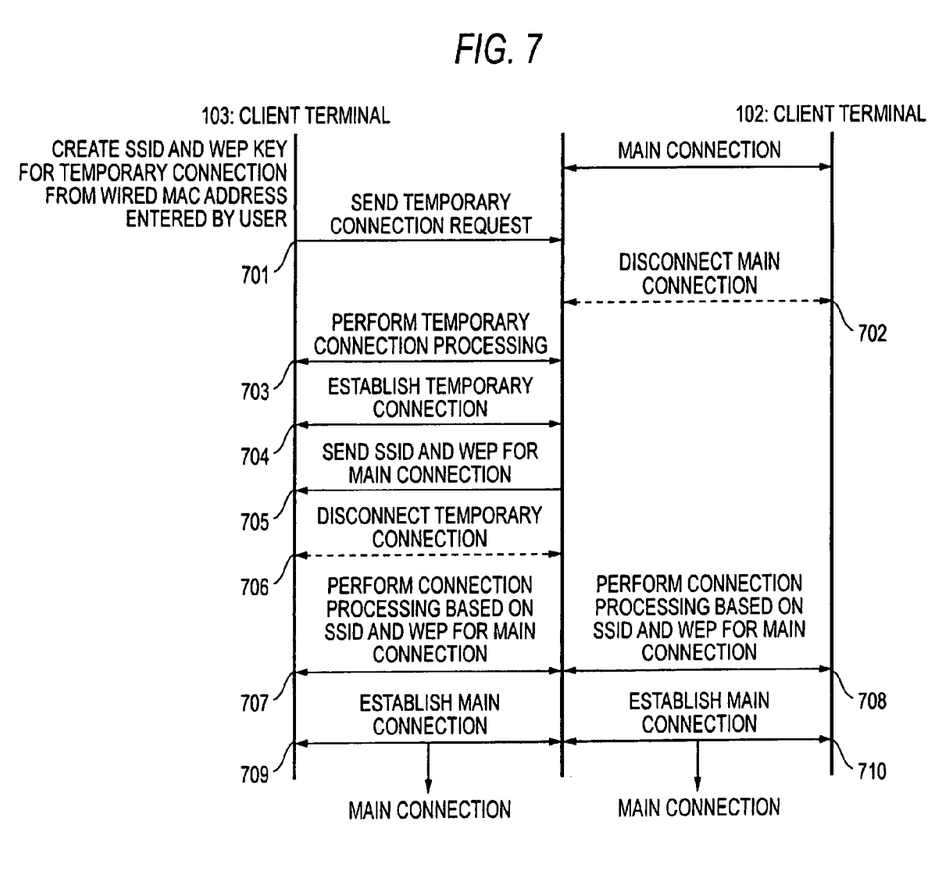
FIG. 7 is a drawing to show an operation procedure example of establishing connection in the wireless connection system.

As techniques for connecting the access point apparatus 101 to the client terminal 103 in a state in which the main connection of the access point apparatus 101 and the client terminal 102 is established, in addition to the above-described technique, at least three techniques are available as described below:

A first technique will be discussed with reference to FIG. 7. In the state in which the main connection of the access point apparatus 101 and the client terminal 102 is established, a state in which the SSID for temporary connection can also be accepted at the same time is set. In this state, when a connection request containing the SSID for temporary connection is received from with the client terminal 103 (step 701), the connection with the client terminal 102 is once disconnected (step 702), temporary connection processing with the client terminal 103 is performed (step 703), temporary connection is established (step 704), and the SSID and the WEP key for main connection are sent to the client terminal 103 according to the temporary connection (step 705). After disconnecting the temporary connection (step 706), the access point apparatus 101 performs main connection processing with the client terminal 102 and the client terminal 103 (steps 707 and 708) and establishes the main connection (steps 709 and 710). According to the technique, the invention can also be applied to the access point apparatus having only one SSID that can be used for connection.

A second technique is a technique of writing the parameter required for main connection into portable memory and reading the parameter in the portable memory into the client terminal 103. According to the technique, the invention can also be used with an access point apparatus having only one SSID that can be used for connection and an access point apparatus having only one type of SSID and one type of WEP key that can be stored in the connection information storage section. Since the parameter required for main connection needs to be physically written into portable memory, the level of the safety is also high.

As a third technique, upon reception of a signal based on any other means than the wireless LAN, such as an infrared signal reception element or a Bluetooth (registered trademark) from the client terminal 103, the access point apparatus 101 disconnects connection with the client terminal 102. After this, the access point apparatus 101 establishes temporary connection with the client terminal 103, sends the SSID and the WEP key for main connection, disconnects the temporary connection, and makes main connection with the client terminal 102 and the client terminal 103. According to the technique, if only one type of SSID and one type of WEP key can be stored in the connection information storage section, the invention can also be applied.

As described above with reference to the embodiment, there is provided a wireless connection system for enabling the user to make easy settings concerning connection at a high level of safety.

The foregoing description of the embodiment of the invention has been presented for purposes of illustration and description. It is not intended to be exhaustive or to limit the invention to the precise form disclosed, and modifications and variations are possible in light of the above teachings or may be acquired from practice of the invention. The embodiment is chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. A client terminal for conducting wireless communications with an access point apparatus having apparatus unique information, the client terminal comprising:
    an acceptance unit that accepts entry of the apparatus unique information;
    a conversion unit that converts the apparatus unique information entered through the acceptance unit into temporary connection information;
    a temporary connection establishing unit that establishes temporary connection with the access point apparatus to acquire main connection information required for main connection with the access point apparatus based on the temporary connection information;
    a reception unit that receives the main connection information from the access point apparatus; and
    a main connection establishing unit that establishes main connection with the access point apparatus based on the main connection information.

2. The client terminal according to claim 1 wherein the acceptance unit accepts entry of the main connection information.

3. The client terminal according to claim 1 wherein the apparatus unique information is information unique to a communication apparatus used for the access point apparatus to conduct wired communications with a different communication terminal.

* * * * *